US009148569B2

(12) United States Patent  (10) Patent No.: US 9,148,569 B2
Resende et al.  (45) Date of Patent: Sep. 29, 2015

(54) CAPTURING AN IMAGE ON A MOBILE DEVICE

(71) Applicant: Bank of America Corporation, Charlotte, NC (US)

(72) Inventors: Paulo Resende, Robbinsville, NJ (US); Sravan Reddy Rekula, Lawrenceville, NJ (US); Bharat Raj Varla, Lawrenceville, NJ (US)

(73) Assignee: Bank of America Corporation, Charlotte, NC (US)

( * ) Notice: Subject to any disclaimer, the term of this patent is extended or adjusted under 35 U.S.C. 154(b) by 138 days.

(21) Appl. No.: 13/683,583

(22) Filed: Nov. 21, 2012

(65) Prior Publication Data

US 2014/0139692 A1  May 22, 2014

(51) Int. Cl.
 *H04N 5/232* (2006.01)
(52) U.S. Cl.
 CPC .................. *H04N 5/23258* (2013.01)
(58) Field of Classification Search
 CPC .................................. H04N 5/23248
 USPC ....................................... 348/208.1
 See application file for complete search history.

(56) References Cited

U.S. PATENT DOCUMENTS

| | | | |
|---|---|---|---|
| 5,790,490 A * | 8/1998 | Satoh et al. ..................... 396/52 |
| 7,561,200 B2 | 7/2009 | Garvey, III et al. |
| 7,653,214 B2 | 1/2010 | Schroeder et al. |
| 8,056,808 B2 | 11/2011 | Epshteyn |
| 8,159,541 B2 | 4/2012 | McLeod |
| 2005/0097046 A1* | 5/2005 | Singfield ................. 705/42 |
| 2006/0072019 A1 | 4/2006 | Stavely et al. |
| 2007/0057067 A1 | 3/2007 | He |
| 2010/0246925 A1* | 9/2010 | Nagatsuka et al. ......... 382/132 |
| 2010/0280859 A1* | 11/2010 | Frederick, II ............. 705/7 |
| 2010/0318461 A1* | 12/2010 | Smith et al. ............... 705/43 |
| 2011/0170740 A1* | 7/2011 | Coleman ................. 382/103 |
| 2011/0225534 A1 | 9/2011 | Wala |
| 2011/0228112 A1* | 9/2011 | Kaheel et al. ............ 348/208.4 |
| 2011/0258113 A1* | 10/2011 | Jones et al. ............... 705/39 |
| 2012/0075487 A1 | 3/2012 | Takita |
| 2013/0044194 A1* | 2/2013 | Tilt et al. ................. 348/61 |
| 2013/0120595 A1* | 5/2013 | Roach et al. ............ 348/207.1 |

FOREIGN PATENT DOCUMENTS

| | | |
|---|---|---|
| CN | 102473172 | 5/2012 |
| GB | 2483224 | 8/2012 |

OTHER PUBLICATIONS

U.S. Patent Application by inventors John J. Stavely, et al., U.S. Appl. No. 10/989,838, 21 pages; expressly abandoned Apr. 10, 2008, Nov. 16, 2004.

(Continued)

*Primary Examiner* — Roberto Velez
*Assistant Examiner* — Cynthia Segura
(74) *Attorney, Agent, or Firm* — Michael A. Springs

(57) ABSTRACT

According to one embodiment of the present invention, a check's image is automatically captured. A stabilization parameter of the mobile device is determined using a movement sensor. It is determined whether the stabilization parameter is greater than or equal to a stabilization threshold. An image of the check is captured using the mobile device if the stabilization parameter is greater than or equal to the stabilization threshold.

19 Claims, 3 Drawing Sheets

(56) References Cited

OTHER PUBLICATIONS

US Patent Application by inventor Stuart McLeod, U.S. Appl. No. 12/053,744, 23 pages, Mar. 24, 2008.

Marius Tico, "Digital Image Stabilization," InTech, ISBN 978-953-307-002-5; http://cdn.intechopen.com/pdfs/9242/InTech-Digital_image_stabliation.pdf; www.intechopen.com; 15 pages; published online Nov. 1, 2009; published in print edition Nov. 2009, Jan. 11, 2009.

* cited by examiner

CAPTURING AN IMAGE ON A MOBILE DEVICE

TECHNICAL FIELD OF THE INVENTION

This invention relates, in general, to capturing an image and, more particularly, to capturing an image on a mobile device.

BACKGROUND OF THE INVENTION

Mobile communication devices have digital camera capabilities. For example, a cell phone may include a digital camera. A user may take a picture with a mobile device and transmit the picture to a remote location. This picture may be of a check to be deposited into a financial account associated with a financial institution.

SUMMARY OF THE INVENTION

In accordance with the present invention, disadvantages and problems associated with capturing an image on a mobile device may be reduced or eliminated.

According to one embodiment of the present invention, a check's image is automatically captured. A stabilization parameter of the mobile device is determined using a movement sensor. It is determined whether the stabilization parameter is greater than or equal to a stabilization threshold. An image of the check is captured using the camera if the stabilization parameter is greater than or equal to the stabilization threshold.

Certain embodiments of the invention may provide one or more technical advantages. A technical advantage of one embodiment facilitates capturing a stable image of a check. A user may find it difficult to position the check under the camera, stabilize the camera, and capture an image of the check simultaneously. Another technical advantage of an embodiment includes communicating feedback to the user regarding the current stability of the camera. Another technical advantage of an embodiment provides for an improved remote check depositing process. Another technical advantage of an embodiment is the improvement of the check's image quality. Another technical advantage of an embodiment allows an enterprise to change the parameters associated with the clarity of a check's image. As camera and image quality technology improve, the required stability at the point of capture may change.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE INVENTION

Figure 1:
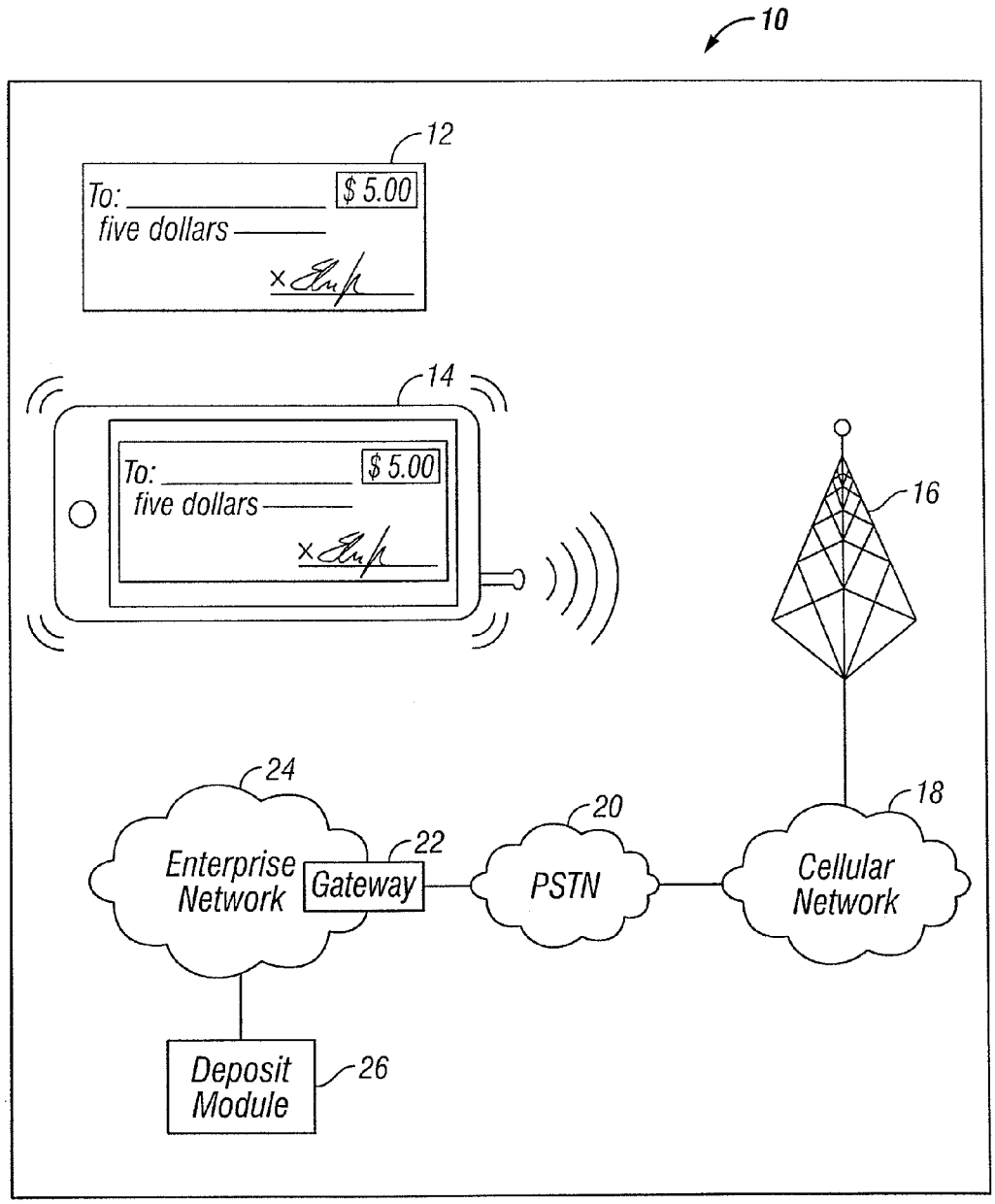
FIG. 1 illustrates an example system to facilitate capturing an image using a mobile device.
Figure 2:
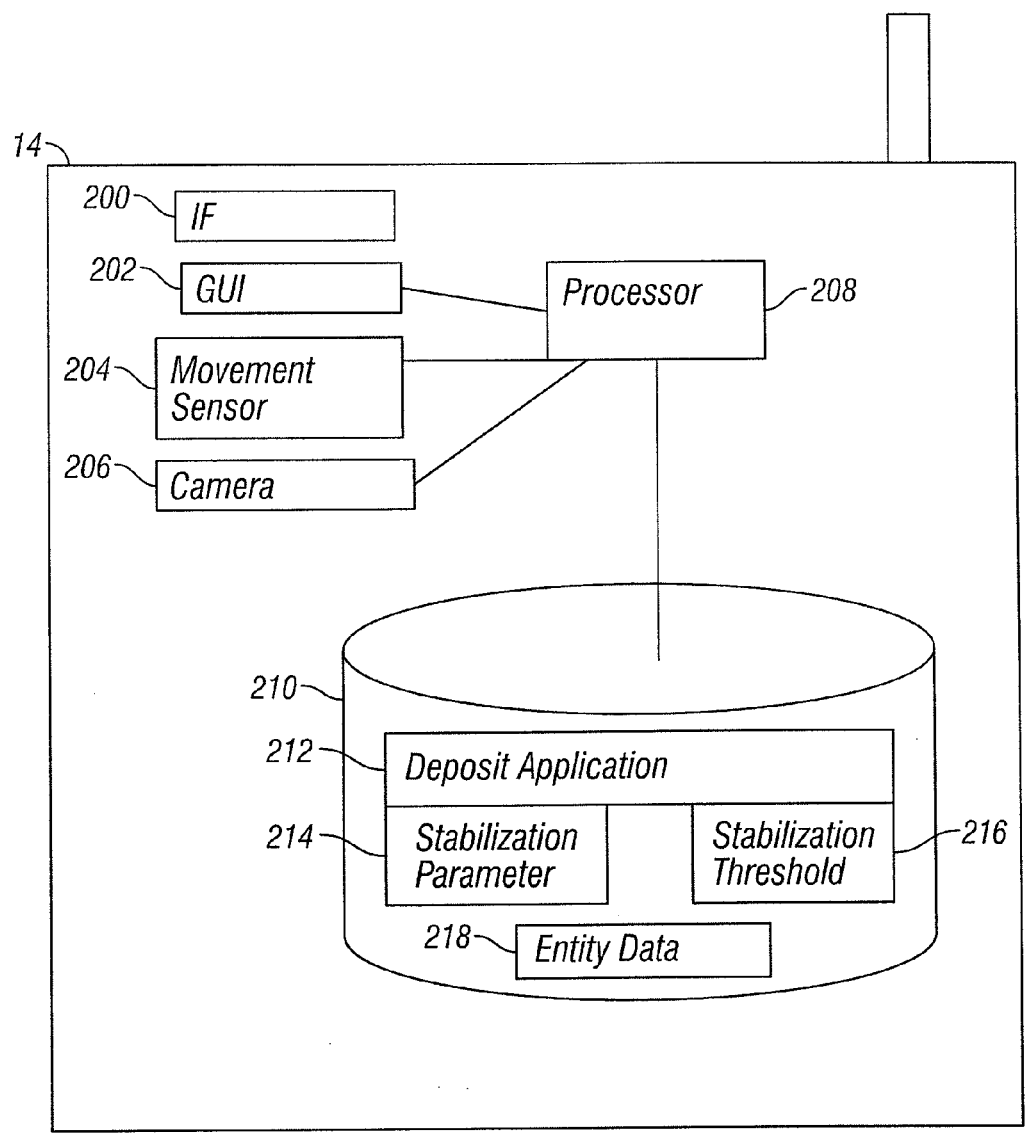
FIG. 2 is a block diagram illustrating a detailed perspective of the mobile device.
Figure 3:
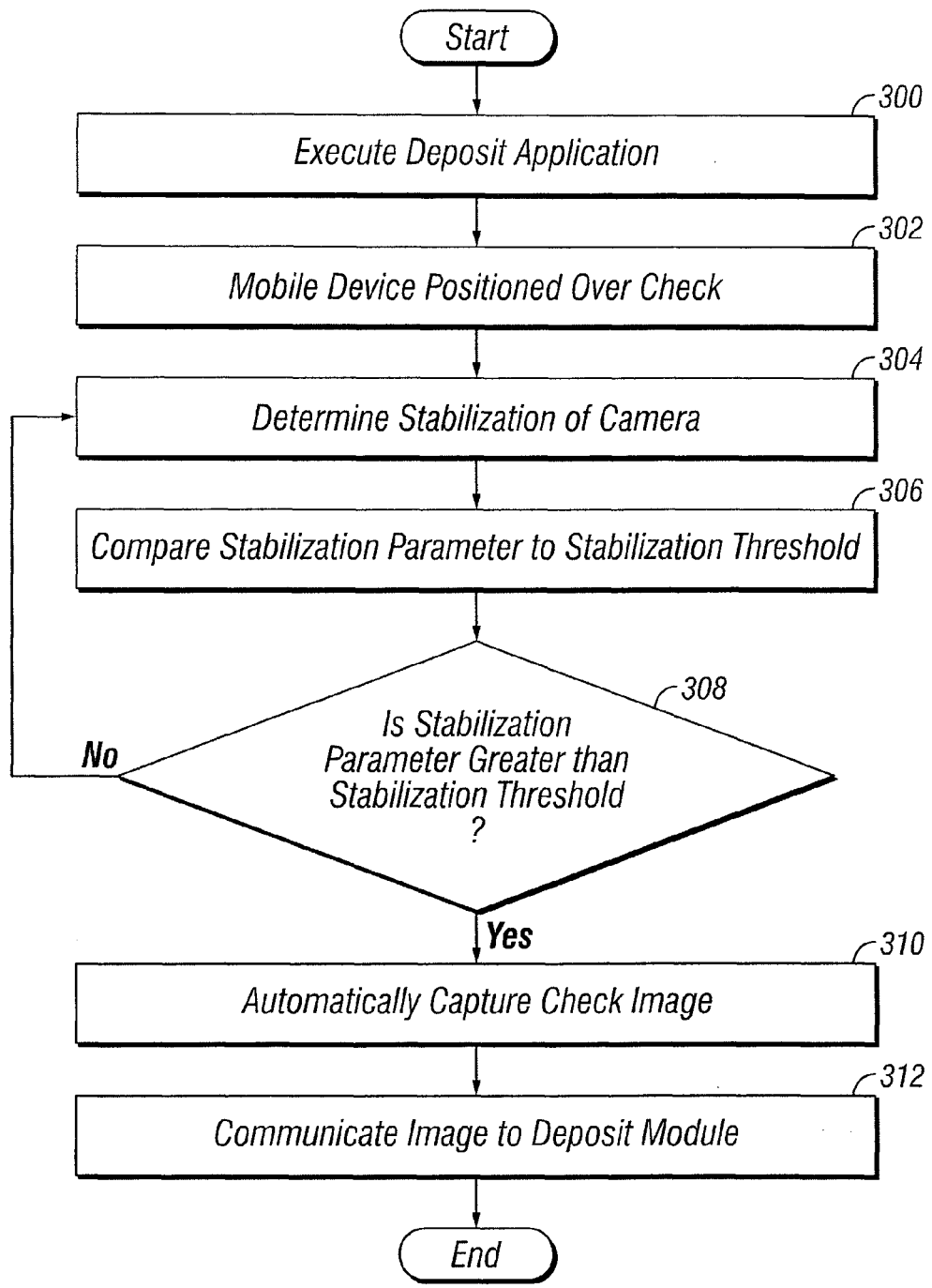
FIG. 3 illustrates an example flow chart for capturing an image using a mobile device.

Embodiments of the present invention and its advantages are best understood by referring to FIGS. 1 through 3 of the drawings, like numerals being used for like and corresponding parts of the various drawings.

Although the present invention has been described in detail, it should be understood that various changes, substitutions, and alterations can be made hereto without departing from the scope of the invention as defined by the appended claims.

Mobile communication devices have digital camera capabilities. For example, a cell phone may include a digital camera. A user may take a picture with a mobile device and transmit the picture to a remote location. This picture may be of a check to be deposited into a financial account associated with a financial institution. However, a user may find it difficult to position the check under the camera, stabilize the camera, and capture an image of the check simultaneously.

Therefore, it is advantageous to provide a system and method to determine stabilization parameters to facilitate capturing an image of the check when the mobile device is stable. Using motion-sensing technology, such as an accelerometer or a gyroscope, the stability of the mobile device is determined. When the mobile device is stable, the camera automatically captures the image. This eliminates a user action to capture the image. In addition, the mobile device may include a stability meter to notify the user of the current stability of the mobile device and/or camera. This is particularly advantageous for mobile banking applications on mobile devices that contain a feature to remotely deposit a check.

FIG. 1 illustrates an example system to facilitate capturing an image using a mobile device. System 10 includes mobile device 14, cellular tower 16, cellular network 18, public switched telephone network (PSTN) 20, gateway 22, enterprise network 24, and deposit module 26. System 10 allows a user of mobile device 14 to capture an image of check 12 and send the check's image to deposit module 26. Deposit module 26 may then begin processing and depositing check 12 into the user's account or an account accessed by the user. Communication between mobile device 14 and deposit module 26 may occur over cellular network 18. Deposit module 26 may communicate a confirmation message to mobile device 14 after receiving the check's image. This confirmation message may include a variety of notifications (e.g., the check image was readable, deposit module 26 could not process the check's image, or any other notification relating to the processing of check 12).

Check 12 is a document that initiates a withdrawal of funds from a first financial account and deposit of funds into a second financial account. Check 12 generally contains the monetary amount and a signature that indicates payment to the recipient for the stated amount. Check 12 may also include a written instrument, a credit card, a receipt, a traveler's check, a currency, a stock certificate, a treasury bill, or any other suitable type of instrument that denotes a transfer of funds between financial accounts.

Mobile device 14 may comprise any type of mobile computing device operable to capture or receive an image and communicate with various components of system 10. In some embodiments, mobile device 14 allows a user to access accounts associated with the user and initiate actions on the account. For example, a user may access the financial account and initiate an action to deposit check 12 into the financial account. Mobile device 14 communicates with deposit module 26 to facilitate processing of the deposit in the user's financial account. Examples of mobile device 14 include a mobile phone, a personal digital assistant, portable media player (e.g., portable video player, digital audio player, etc.), laptop, netbook, Ultrabook, tablet, and any other suitable device. Mobile device 14 includes any necessary hardware and software suitable to carry out its functions. Certain embodiments of mobile device 14 include network interface 200, processor 208, memory 210, camera 206, and graphical user interface (GUI) 202, which will be described in greater detail with respect to FIG. 2.

Cellular tower 16, cellular network 18, PSTN 20, and gateway 22 represent components that facilitate communication between the components in system 10. While specific components are illustrated, the disclosure contemplates any suitable network operable to facilitate communication between the components of system 10. A network may include any interconnecting system capable of transmitting audio, video, signals, data, messages, or any combination of the preceding. As an example and not by way of limitation, one or more portions of the network, consisting of cellular tower 16, cellular network 18, PSTN 20, and/or gateway 22, may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of PSTN, a cellular telephone network, or a combination of two or more of these.

Enterprise network 24 represents a private network of an organization, such as a financial institution, corporation, government, or other entity. In particular embodiments, enterprise network 24 is owned and/or controlled by the organization and access to enterprise network 24 is controlled by the organization. Enterprise network 24 includes any suitable number of interconnected resources and networks.

Deposit module 26 represents a component within enterprise network 24 that facilitates depositing check 12. Deposit module 26 may be controlled by a financial institution, such as a commercial bank. Deposit module 26 may manipulate, access, and/or report on accounts associated with mobile device 14 and deposit application 212. For example, deposit module 26 initiates the deposit of check 12 into the user's financial account. To deposit check 12, deposit module 26 may extract information from a check image, such as an account number, a routing number, and a check amount from the image. Deposit module 26 communicates with enterprise network 24 to initiate the transfer of funds based on information provided on the check's image. Deposit module 26 may also communicate to mobile device 14 a notification relating to the depositing of check 12 (e.g., confirmation of receiving the check image).

Deposit module 26 may manage any suitable financial account. For example, deposit module 26 may manage a checking account, a savings account, a brokerage account, a loan account, a credit card account, and/or any other suitable financial accounts.

Deposit module 26 may include a network server, any suitable remote server, a mainframe, a host computer, a workstation, a web server, a personal computer, a file server, or any other suitable device operable to facilitate depositing of check 12. In some embodiments, deposit module 26 may execute any suitable operating system such as IBM Z-series Operating System (z/OS), MS-DOS, PC-DOS, MAC-OS, Windows, UNIX, OpenVMS, Linux, iOS, Android, and/or any other appropriate operating system, including operating systems developed in the future. The functions of deposit module 26 may be performed by any suitable combination of one or more servers or other components at one or more locations. In the embodiment where the modules are servers, the servers may be public or private servers and each server may be a virtual or physical server. The server may include one or more servers at the same location or at locations remote from one another. Additionally, deposit module 26 may include a network interface, a processor, and memory similar to the network interfaces, processors, and memories provided on mobile device 14.

In an exemplary embodiment of operation, a user of mobile device 14 places check 12 under a camera of mobile device 14. Mobile device 14 determines its stability and automatically captures an image of check 12 based on that determination. Mobile device 14 communicates an image of check 12 to deposit module 26 through a number of networks. Mobile device 14 communicates the check image to cellular tower 16. Cellular tower 16 communicates the check image to cellular network 10, which then communicates the check image to PSTN 20. PSTN 20 then communicates the check image to gateway 22. Once at gateway 22, the check image is sent to enterprise network 24, which contains deposit module 26. Deposit module 26 processes the image and facilitates the transfer of funds between financial accounts based on information in the image of check 12. Deposit module 26 communicates notifications to mobile device 14, which may include information regarding receiving the image of check 12, such as error in processing the image of check 12, additional information to initiate the transfer of funds between financial accounts, notification of the lack of authority to deposit check 12, or any other notification relating to the processing of check 12.

A component of system 10 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 10 without departing from the scope of the invention. For example, system 10 may include any number of mobile devices 14, cellular towers 16, cellular networks 18, PSTNs 20, gateways 22, enterprise networks 24 and deposit modules 26. Any suitable logic may perform the functions of system 10 and the components within system 10.

FIG. 2 is a block diagram illustrating a detailed perspective of mobile device 14. Mobile device 14 determines its stability and automatically captures a check's image based on that determination. In the illustrated embodiment, mobile device 14 includes network interface 200, GUI 202, movement sensor 204, camera 206, processor 208, and memory 210.

Network interface 200 represents any suitable device operable to receive information from a network and/or local network, perform suitable processing of the information, communicate to other devices, or any suitable combination of the preceding. For example, network interface 200 may transmit information regarding an image of check 12 and user information to deposit module 26 over a communication network. Network interface 200 represents any port or connection, real or virtual, including any suitable hardware and/or software, including protocol conversion and data processing capabilities, to communicate through a local area network (LAN), a wide area network (WAN), or other communication systems that allow mobile device 14 to communicate with other suitable components of system 10, such as enterprise network 24 and deposit module 26.

GUI 202 displays information associated with the automatic check-capturing system. GUI 202 receives information from the user and/or any other suitable source. GUI 202 is generally operable to tailor and filter data entered by or presented to the user. GUI 202 may provide the user with an efficient and user friendly presentation of information. For example, GUI 202 may display information associated with the user account and provide options for actions in the check-capturing system, such as displaying a stability monitor to indicate the current stability of mobile device 14. As another example, GUI 202 displays a confirmation prompt when receiving a confirmation notification from deposit module 26. GUI 202 may comprise a plurality of displays having interactive fields, pull-down lists, and buttons operated by the user. GUI 202 may include multiple levels of abstraction including groupings and boundaries. It should be understood that the term GUI may be used in the singular or in the plural to describe one or more GUIs and each of the displays of a particular GUI.

GUI 202 may be displayed to a user using a web browser that allows a user of mobile device 14 to interact with the website associated with an organization, for example. GUI 202 may facilitate transmission and/or receipt of information such as a check image from the website. Suitable web browsers may include Microsoft Internet Explorer®, Mozilla Firefox®, Google Chrome™, Apple Safari™, or Opera®. In certain embodiments, GUI 202 may be displayed using an application natively installed in mobile device 14. For example, an enterprise associated with an enterprise server may create and distribute deposit application 212 with the hardware and software platform of a device that operates outside of a web browser. A user may install deposit application 212 on mobile device 14 and interact with the GUI 202 provided by deposit application 212 to communicate with deposit module 26.

Movement sensor 204 represents any suitable indicator used to determine a position and/or motion (e.g., velocity, acceleration, or any other type of motion) of one or more points of mobile device 14 and/or camera 206. Movement sensor 204 may be communicatively coupled to processor 208 to communicate position and/or motion data to processor 208. Movement sensor 204 may comprise a single-axis accelerometer, a two-axis accelerometer, or a three-axis accelerometer. For example, a three-axis accelerometer measures linear acceleration in the x, y, and z directions. Movement sensor 204 may be any motion-sensing device, including a gyroscope, a global positioning system (GPS) unit, a digital compass, a magnetic compass, an orientation center, magnetometer, a motion sensor, rangefinder, any combination of the preceding, or any other type of device suitable to detect and/or transmit information regarding the position and/or motion of mobile device 14 and/or camera 206.

Camera 206 is an image capturing device that is operable to capture and communicate an image to processor 208. In the illustrated embodiment, camera 206 is communicatively coupled to processor 208. Camera 206 may also be an image repository system in mobile device 14 or memory 210, a video camera, an e-mail attachment, an image located on the Internet, an image stored in memory 210, or any other type of device and/or system suitable to capture and communicate an image to processor 208.

Processor 208 is communicatively coupled to network interface 200, movement sensor 204, camera 206, and memory 210. Processor 208 controls the operation and administration of mobile device 14 by processing information received from network interface 200, movement sensor 204, camera 206, and memory 210. Processor 208 includes any hardware and/or software that operates to control and process information. For example, processor 208 executes deposit application 212 to control the depositing operation of mobile device 14. Processor 208 may be a programmable logic device, a microcontroller, a microprocessor, or any suitable processing device, or any combination of the preceding.

Memory 210 stores either permanently or temporarily data, operational software, rules or other information used by processor 208. Memory 210 includes any one or a combination of volatile or non-volatile, local or remote devices suitable for storing information such as non-transitory computer readable storage medium. For example, memory 210 may include random access memory (RAM), read only memory (ROM), magnetic storage devices, optical storage devices, or any other suitable information storage device or a combination of these devices. While illustrated as including particular modules, memory 210 may include any suitable information for use in the operation of mobile device 14.

Additionally, memory 210 may include any suitable software to carry out the functions of mobile device 14. For example, mobile device 14 may run any suitable operating system such as WINDOWS, MAC-OS, UNIX, LINUX, iOS, Windows Mobile, Android, and/or any other suitable operating system. Mobile device 14 may also include any suitable native applications, such as a web browser application, a messaging application, and/or a natively-installed client application configured to carry out the functions of mobile device 14. For example, a user of mobile device 14 may use an account manager application natively installed on mobile device 14 to facilitate determining a stabilization parameter and capturing an image of a check on mobile device 14. Certain embodiments of memory 210 include deposit application 212, stabilization parameter 214, stabilization threshold 216, and entity data 218.

Deposit application 212 represents any suitable set of instructions, logic, or code embodied in a non-transitory computer-readable medium and operable to facilitate detecting a stable capture moment and automatically capturing an image of check 12. For example, in particular embodiments, deposit application 212 may control GUI 202 that appears on a display of mobile device 14.

Deposit application 212 may also facilitate the display of stabilization parameter 214 and stabilization threshold 216 on GUI 202. Deposit application 212 may display stabilization parameter 214 on a color graph with a variation of colors indicating the relative stability of the camera. For example, if stabilization parameter 214 is low (indicating that mobile device 14 is unstable), the color graph will display a shade of yellow or red. If stabilization parameter 214 is high and nearing stabilization threshold 216, the color graph may display a shade of green. The color graph may comprise any suitable type of graphic or visual that indicates the stability of either mobile device 14 or camera 206 to a user.

Deposit application 212 may manage and/or access any suitable account. For example, deposit application 212 may have access to a checking account, a savings account, a brokerage account, a loan account, a credit card account, and/or any other suitable accounts.

Deposit application 212 may include logic and/or rules for storing information in entity data 218. For example, deposit application 212 may instruct mobile device 14 to retrieve information associated with entities from enterprise network 24. These rules may be updated periodically according to a predetermined schedule, at the request of the user, at any other suitable time, and/or according to any suitable combination of the preceding.

Stabilization parameter 214 is a value determined from the data received from movement sensor 204 and stored on memory 210. The data represents a change in position and/or motion to mobile device 14. Stabilization parameter 214 may be a dataset of values (e.g., position change in X-axis, position change in Y-axis, and position change in Z-axis) or a single value. The dataset of values in stabilization parameter 214 may reflect the change in position and/or motion of mobile device 14 on the X, Y, and Z axes. Stabilization parameter 214 may be a function of an algorithm, of a mean, of a standard deviation, or of a variance of the data received from movement sensor 204. Stabilization parameter 214 may also be any other suitable type of value and/or data that represents the position and/or motion of mobile device 14 or camera 206.

For example, in one embodiment, deposit application 212 receives the acceleration of mobile device 14 according to its X, Y, and Z axes. Deposit application 212 stores these values as variables prevX, prevY, and prevZ. Deposit application 212 waits a predetermined amount of time, and then receives an updated acceleration of device in the X, Y, and Z axes. Deposit application 212 stores these values as curX, curY, and curZ. Next, deposit application 212 determines the change in acceleration in the X, Y, and Z axes by subtracting prevX from curX, prevY from curY, and prevZ from curZ and then stores these values as difX, difY, and difZ. Finally, stabilization parameter 214 may be determined by taking the average of the absolute value of difX, difY, and difZ. Stabilization parameter may also be determined by taking the mean, median, standard deviation, variance, or function of an algorithm of difX, difY, and difZ.

Stabilization threshold 216 is a value that represents the minimum stability required for deposit application 212 to initiate capturing the image of check 12 by camera 206. Stabilization threshold 216 may be a single value or a dataset, and may be a fixed number or an adaptive number. Adaptive stabilization thresholds can be a function of an algorithm, of a mean, of a standard deviation, or of a variance of the data received from movement sensor 204. Adaptive stabilization threshold may also be based on previous stabilization parameter values. For example, in one embodiment, mobile device 14 records twenty iterations of stabilization parameter 214. Stabilization threshold 216 may then be determined to be one standard deviation lower than the previous twenty stabilization parameter 214 iterations. As a new stabilization parameter 214 is recorded, stabilization threshold 216 will adjust its value accordingly.

In certain embodiments, memory 210 includes entity data 218. Entity data 218 includes any rules and/or data associated with any entity accessing deposit application 212. For example, entity data 218 may include a data structure that associates a particular entity with a certain entity code. Entity data 218 may also include association between the entities and other information such as the entities' complete name, address, phone numbers, routing number, account number, and/or any other suitable information. In certain embodiments, entity data 218 also includes a flag that indicates whether a certain entity is or is not authorized to deposit a check via the automatic check-capturing system. In alternative embodiments, an entity is authorized to deposit a check by virtue of being included in entity data 218.

FIG. 3 illustrates an example flow chart for capturing an image using a mobile device. The method begins at step 300 when mobile device 14 receives a command to execute deposit application 212. In certain embodiments, deposit application 212 may be a subset or a module of another application (e.g., a banking application). Deposit application 212 may communicate instructions to the user regarding positioning check 12 under camera 206.

At step 302, mobile device 14 is positioned over check 12. Mobile device 14 may be positioned diagonally, overhead, at an angle from the check, or at any other position that positions check 12 within the frame of camera 206. In one embodiment, deposit application 212 notifies the user when check 12 is under camera 206.

The next step, step 304, is to determine the stability of mobile device 14. Mobile device 14 determines its stability by using movement sensor 204 to generate stabilization parameter 214. Mobile device 14 may update stabilization parameter 214 within a preset time period or an adaptive time period. For example, mobile device 14 may update stabilization parameter 214 after every fifty milliseconds of inactivity.

At step 306, deposit application 212 compares stabilization parameter 214 to stabilization threshold 216. If stabilization parameter 214 is greater than stabilization threshold 216, deposit application 212 proceeds to step 308. If stabilization parameter 214 is less than or equal to stabilization threshold 216, deposit application 212 will repeat steps 304 to 306 to allow mobile device 14 to become more stable. In other embodiments, the comparison between stabilization parameter 214 and stabilization threshold 216 may include variations that output a result from that comparison.

If stabilization parameter 214 exceeds stabilization threshold 216, the method proceeds to step 310. At step 310, mobile device 14 automatically captures the image of check 12. To capture the image, deposit application 212 may communicate a signal to camera 206. Camera 206 may capture one image or multiple images. In some embodiments, deposit application 212 may automatically determine whether camera 206 should use flash and adjust flash settings accordingly. In other embodiments, deposit application 212 contains an option to turn the camera flash on or off. In some embodiments, deposit application 212 may automatically adjust the camera resolution. Once a check's image is captured, deposit application 212 may specify that a prompt be shown to the user of mobile device 14 requesting approval to communicate the check's image to deposit module 26. The prompt may include other identifying information associated with the check's image, such as routing number, account number, and check amount. The user may indicate approval or non-approval using a suitable control on GUI 202.

At step 312, mobile device 14 communicates the check image to deposit module 26. In certain embodiments, deposit application 212 may extract account number, routing number, and a check amount from the check image and transmit account number, routing number, and check amount to deposit module 26. In other embodiments, deposit application 212 may compress the check's image and communicate the compressed form of the check image to deposit module 26.

Modifications, additions, or omissions may be made to method depicted in FIG. 3. The method may include more, fewer, or other steps. For example, deposit application 212 may specify that a prompt be shown to the user of mobile device 14 requesting approval to communicate the check's image to deposit module 26. Additionally, steps may be performed in parallel or in any suitable order. While discussed as mobile device 14 performing the steps, any suitable component of system 10 may perform one or more steps of the method.

Certain embodiments of the invention may provide one or more technical advantages. A technical advantage of one embodiment facilitates capturing a stable image of a check. A user may find it difficult to position the check under the camera, stabilize the camera, and capture an image of a check simultaneously. Another technical advantage of an embodiment includes communicating feedback to the user regarding the current stability of the camera. Another technical advantage of an embodiment provides for an improved remote check depositing process. Another technical advantage of an embodiment is the improvement of check's image quality. Another technical advantage of an embodiment allows an enterprise to change the parameters associated with the clarity of a check's image. As cameras and image quality technology improve, the required stability at the point of capture may change.

Certain embodiments of the invention may include none, some, or all of the above technical advantages. One or more other technical advantages may be readily apparent to one skilled in the art from the figures, descriptions, and claims included herein.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A device for automatically capturing an image, comprising:
    a camera operable to capture an image;
    a movement sensor operable to sense movement;
    a memory operable to store entity data, wherein the entity data associates a user of the device to an entity code;
    a processor communicatively coupled to the memory, the movement sensor, and the camera, and operable to:
        determine whether the entity code is authorized to deposit a check;
        when the entity code is authorized to deposit the check:
            determine a stabilization parameter of the camera using the movement sensor;
            determine a stabilization threshold, the stabilization threshold determined from one or more previous stabilization parameters;
            determine whether the stabilization parameter is greater than the stabilization threshold; and
            instruct the camera to capture the image of the check if the stabilization parameter is greater than the stabilization threshold; and
    a graphical user interface communicatively coupled to the processor and operable to display the stabilization parameter.

2. The device of claim 1, wherein the memory is further operable to store a deposit application; and
    wherein the processor is further operable to execute the deposit application.

3. The device of claim 1, wherein the stabilization parameter is based on a motion of the camera on the x-axis, a motion of the camera on the y-axis, and a motion of the camera on the z-axis.

4. The device of claim 1, further comprising:
    a network interface communicatively coupled to the processor, the network interface is operable to transmit and receive communications;
    wherein the processor is further operable to communicate the image of the check to a deposit module.

5. The device of claim 1, wherein the movement sensor comprises an accelerometer.

6. The method of claim 1, further comprising:
    a network interface communicatively coupled to the processor, the network interface operable to transmit and receive communications;
    wherein the processor is further operable to:
        extract an account number, a routing number, and a check amount from the image;
        communicate the account number, the routing number, and the check amount to a deposit module.

7. A method for automatically capturing an image, comprising:
    storing entity data, wherein the entity data associates a device user to an entity code;
    determining, by a processor, whether the entity code is authorized to capture an image of a check;
    when the entity code is authorized to capture the image of the check:
        determining, by the processor, a stabilization parameter of a mobile device using a movement sensor;
        determining, by the processor, a stabilization threshold, the stabilization threshold determined from one or more previous stabilization parameters;
        displaying, by a graphical user interface, the stabilization parameter;
        determining, by the processor, whether the stabilization parameter is greater than the stabilization threshold; and
        automatically capturing the image of the check using a camera if the stabilization parameter is greater than the stabilization threshold.

8. The method of claim 7, further comprising executing a deposit application.

9. The method of claim 7, wherein capturing an image of the check comprises capturing the image of the check using the camera of a mobile device.

10. The method of claim 7, wherein determining a stabilization parameter is based on a motion of the camera on the x-axis, a motion of the camera on the y-axis, and a motion of the camera on the z-axis.

11. The method of claim 7, further comprising communicating the image of the check to a deposit module.

12. The method of claim 7, wherein the motion sensor comprises an accelerometer.

13. The method of claim 7, further comprising:
    extracting an account number, a routing number, and an amount value from the image; and
    communicating the account number, the routing number, and the amount value to a deposit module.

14. A non-transitory computer readable medium comprising logic, the logic when executed by a processor, operable to:
    store entity data, wherein the entity data associates a device user to an entity code;
    determine whether the entity code is authorized to deposit a check;
    when the entity code is authorized to deposit the check:
        determine a stabilization parameter of a camera using a movement sensor;
        determine a stabilization threshold, the stabilization threshold determined from one or more previous stabilization parameters;
        display the stabilization parameter;
        determine whether the stabilization parameter is greater than the stabilization threshold; and
        automatically capture the image of the check using the mobile device if the stabilization parameter is greater than the stabilization threshold.

15. The non-transitory computer readable medium of claim 14, further operable to execute a deposit application.

16. The non-transitory computer readable medium of claim 14, wherein capturing an image of the check comprises capturing the image of the check using the camera of a mobile device.

17. The non-transitory computer readable medium of claim 14, wherein determining a stabilization parameter is based on a motion of the camera on the x-axis, a motion of the camera on the y-axis, and a motion of the camera on the z-axis.

18. The non-transitory computer readable medium of claim 14, further operable to communicate the image of the check to a deposit module.

19. The non-transitory computer readable medium of claim 14, further operable to: extract an account number, a routing number, and an amount value from the image; and communicate the account number, the routing number, and the amount value to a deposit module.

* * * * *